US008376505B2

(12) United States Patent
Maeshima et al.

(10) Patent No.: US 8,376,505 B2
(45) Date of Patent: Feb. 19, 2013

(54) MEDIA PROCESSING DEVICE AND A CONTROL METHOD AND PROGRAM THEREFOR

(75) Inventors: Hidetoshi Maeshima, Nagano-ken (JP); Junichi Otsuka, Nagano-ken (JP); Kazuya Toshima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 353 days.

(21) Appl. No.: 12/688,403

(22) Filed: Jan. 15, 2010

(65) Prior Publication Data

US 2010/0182360 A1 Jul. 22, 2010

(30) Foreign Application Priority Data

Jan. 19, 2009 (JP) ................................ 2009-008925

(51) Int. Cl.
*B41J 2/165* (2006.01)
*B41J 29/38* (2006.01)
*G06F 19/00* (2006.01)
*G06F 3/12* (2006.01)

(52) U.S. Cl. ............... 347/22; 347/9; 347/23; 358/1.13; 700/100

(58) Field of Classification Search ................ 347/9, 22, 347/23; 700/100; 350/1.13
See application file for complete search history.

(56) References Cited

U.S. PATENT DOCUMENTS

| | | | | |
|---|---|---|---|---|
| 5,518,325 | A * | 5/1996 | Kahle | 400/70 |
| 6,095,631 | A * | 8/2000 | Suzumura et al. | 347/22 |
| 6,398,336 | B1 * | 6/2002 | Yoda et al. | 347/23 |
| 6,837,566 | B2 * | 1/2005 | Mitsuzawa et al. | 347/23 |
| 7,054,025 | B2 * | 5/2006 | Yamamoto | 358/1.15 |
| 7,905,669 | B2 * | 3/2011 | Fukano | 400/76 |
| 8,050,787 | B2 * | 11/2011 | Otsuka et al. | 700/100 |
| 2008/0250436 | A1 * | 10/2008 | Kawakami | 720/601 |
| 2010/0125796 | A1 * | 5/2010 | Sato et al. | 715/733 |

FOREIGN PATENT DOCUMENTS

| | | |
|---|---|---|
| JP | 2000-222809 A | 8/2000 |
| JP | 2006-331534 | 12/2006 |
| JP | 2007-149173 | 6/2007 |
| JP | 2007-305239 A | 11/2007 |

* cited by examiner

*Primary Examiner* — Laura Martin
*Assistant Examiner* — Jeremy Bishop

(57) ABSTRACT

A media processing device, control method therefor, and associated program prevent a drop in the throughput of a media production process due to cleaning the print head. A publisher has a media drive, a transportation unit that conveys a recording medium according to a transportation command received from a host, and a printer that discharges ink from the nozzles of a print head to print on the label side of the recording medium. The printer also applies a cleaning process to the print head according to an internal signal that is generated when the transportation command or a data write command is received from a host. The cleaning process is executed while the media is conveyed.

12 Claims, 5 Drawing Sheets

MEDIA PROCESSING DEVICE AND A CONTROL METHOD AND PROGRAM THEREFOR

CROSS-REFERENCE TO RELATED APPLICATION(S)

Japanese Patent application No. 2009-008925 is hereby incorporated by reference in its entirety.

BACKGROUND

1. Field of Invention

The present invention relates to a media processing device that applies a data writing process to the recording surface of media and applies a printing process to the printing surface of media based on commands from a host computer.

2. Description of Related Art

Media processing devices that have a media storage unit for storing media such as CDs and DVDs, a media drive for writing data to media and reading data from media, a label printer for printing a label containing such information as the title of the written data or the date the disc was recorded on the label side of the media to which data was written, a media transportation mechanism for conveying the media, and a control unit for controlling driving other parts of the media processing device are known from the literature. See, for example, Japanese Unexamined Patent Appl. Pub. JP-A-2006-331534.

The media transportation mechanism, media drive, and printer of the media processing device described in JP-A-2006-331534 receive media publishing jobs from an application running on a host computer that is communicably connected with the media processing device, and respective drivers control the media drive, printer, and media transportation mechanism to apply specific processes to the media.

FIG. 5 describes the steps of a media production process whereby the media processing device described in JP-A-2006-331534 processes media based on media publishing jobs from an application installed on the host computer.

When the host computer completes inputting information (such as inputting data to be written on the recording surface of the media, and inputting data to be printed on the label side of the media) to the application and asserts a media publishing command, a media production job is created. When a transportation command to the media transportation mechanism is sent to the media processing device based on the media production job (step S101), the media transportation mechanism conveys media from the media storage unit to the media drive accordingly (step S102). When media transportation is completed, an appropriate report is sent to the host computer. The media drive that received the media then writes data (step S104) according to the received write command (step S103).

When the media transportation mechanism then receives a transportation command from the host computer for conveying the media from the media drive to the printer (step S105), the media transportation mechanism conveys the media from the media drive to the printer (step S106), and reports to the host computer when media transportation is completed. When the printer that received the media then receives a print command from the host computer (step S107), the printer determines if cleaning the print head before starting the printing process is required based on the status of the previous print head cleaning operation.

If the printer that received the print command determines that cleaning the print head is required, the printer selects the head cleaning operation to be applied based on preset head cleaning conditions, and cleans the print head (step S108). The printer then prints on the media after cleaning ends (step S109).

When the media transportation mechanism receives a transportation command from the host computer to move the media from the printer to the media storage unit after printing is completed (step S110), the media transportation mechanism conveys the media from the printer to the media storage unit as directed by the command (step S111), and the media production process ends.

The printer disposed in the media processing device described in JP-A-2006-331534 is an inkjet printer that discharges ink supplied from ink cartridges from the nozzles of the print head to print on the label side of the media. In order to prevent a drop in print quality due to dirty or clogged nozzles, inkjet printers require head cleaning based on how dirty or clogged the print head is at a regular or irregular interval.

The head cleaning operations that can be used typically include a wiping operation that wipes the nozzle surface of the print head, and vacuum operations that suck a predetermined amount of ink from the nozzles of the print head and include a main vacuuming operation, a low volume vacuuming operation, a dummy vacuuming operation, and a resting operation. In step S108 described above, one or a combination of these print head cleaning operations are applied according to how dirty or clogged the print head is.

As shown in FIG. 5, when the printer conventionally receives a print command in step S107, the printer determines whether cleaning is necessary based on the previous cleaning status of the print head, and executes a cleaning process if it determines that cleaning is necessary. Because the printer cannot start the process of printing on the label side of the media until the print head cleaning process is completed, the start of printing is delayed and the throughput of the media production process drops.

When the print head can be sufficiently cleaned with a light cleaning operation such as wiping the nozzle surface of the print head, the delay to the start of printing is not particularly noticeable, and the drop in the throughput of the media production process is not particularly a problem.

However, when the print head is particularly dirty and the cleaning process is relatively long as a result of combining plural cleaning operations, cleaning takes a long time and the drop in the throughput of the media production process cannot be ignored. A powerful cleaning operation with a relatively long processing time is required particularly when the print head has not been used for a long time, such as when the power to the media processing device is turned from off to on. The time required to start printing, that is, the delay to first print, is therefore extreme.

SUMMARY OF INVENTION

A media processing device, and a control method and program therefor, according to the present invention are directed to solving the foregoing problem and prevent a drop in the throughput of the media production process due to cleaning the print head.

A first aspect of the invention is a media processing device having a printing unit that executes a printing process to discharge ink from the nozzles of a print head and print on a label side of media, and applies a cleaning process to the print head, and a transportation unit that conveys the media to the printing unit. The printing unit executing the cleaning process parallel to the media transportation process according to an internal signal that is a signal other than a print command and a cleaning execution command applied to the printing unit and is sent and received within the media processing device.

Preferably, the media processing device also has a data writing unit that executes a data writing process on a recording surface of media, and the printing unit executes the cleaning process parallel to the data writing process according to an internal signal that is a signal other than a print command and a cleaning execution command applied to the printing unit and is sent and received within the media processing device.

Thus configured, the printing unit executes the cleaning process according to an internal signal that is sent and received within the media processing device independently of print commands and cleaning commands from the host computer. The cleaning process can therefore be executed when triggered by the internal signal before a print command is received from the host computer, and a drop in the throughput of the media production process due to cleaning can therefore be prevented.

In a media processing device according to another aspect of the invention the internal signal is a signal that is sent from the transportation unit to the printing unit when the transportation unit receives a transportation command for conveying the media to the data writing unit from a host computer that is communicably connected to the media processing device.

If the transportation unit sends the internal signal to the printing unit when a transportation command is received from the host computer, the printing unit can execute the cleaning process parallel to the media transportation process triggered by the internal signal before a print command is received from the host computer.

In a media processing device according to another aspect of the invention the internal signal is a signal that is sent from the data writing unit to the printing unit when the data writing unit receives a write command specifying a data writing process from a host computer that is communicably connected to the media processing device.

If the data writing unit sends the internal signal to the printing unit when a write command is received from the host computer, the printing unit can execute the cleaning process parallel to the data writing process triggered by the internal signal before a print command is received from the host computer.

In a media processing device according to another aspect of the invention the internal signal contains a processing time of the data writing process, and the printing unit determines the type of cleaning process to be applied to the print head according to said processing time.

Because the printing unit in this aspect of the invention can know the processing time of the writing process, the optimum cleaning process can be selected and executed according to the processing time. For example, if the amount of data to be recorded is not particularly great, the printing process can be started soon after a print command is received by selecting a cleaning process that requires relatively little time.

Another aspect of the invention is a control method for a media processing device that has a printing unit that executes a printing process to discharge ink from the nozzles of a print head and print on a label side of media, and applies a cleaning process to the print head, and a transportation unit that conveys the media to the printing unit. The control method includes a receiving step of the printing unit receiving an internal signal that is a signal other than a print command and a cleaning execution command applied to the printing unit and is sent and received within the media processing device; and a cleaning step of executing a cleaning process parallel to the media transportation process.

Another aspect of the invention is a control method for a media processing device that also has a data writing unit that executes a data writing process on a recording surface of media, and the control method further also has a receiving step of the printing unit receiving an internal signal that is a signal other than a print command and a cleaning execution command applied to the printing unit and is sent and received within the media processing device; and a cleaning step of executing the cleaning process parallel to the data writing process according to the internal signal.

Another aspect of the invention is a program that causes a computer disposed to the media processing device to execute the receiving step and the cleaning step described above.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a media processing device according to a preferred embodiment of the invention is described below with reference to the accompanying figures.

It should be noted that a disc publisher (referred to below as simply a "publisher") that writes data on disc-shaped media such as CDs and DVDs and prints on the label side of such media is described below as an example of a media processing device according to the invention.

Configuration of a Publisher

Figure 1:
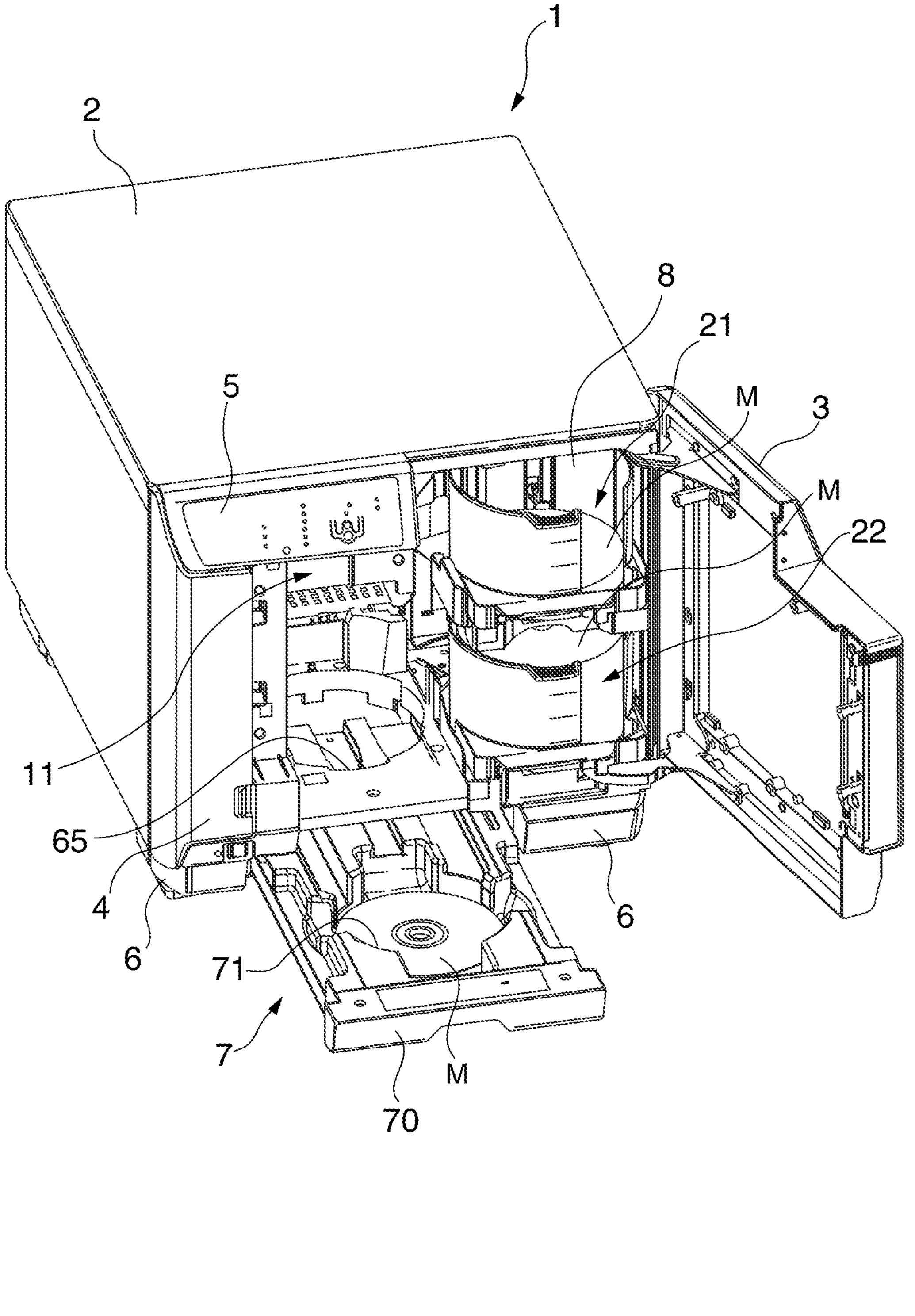
FIG. 1 is an external oblique view of a publisher according to a preferred embodiment of the invention with the access covers open.
Figure 2:
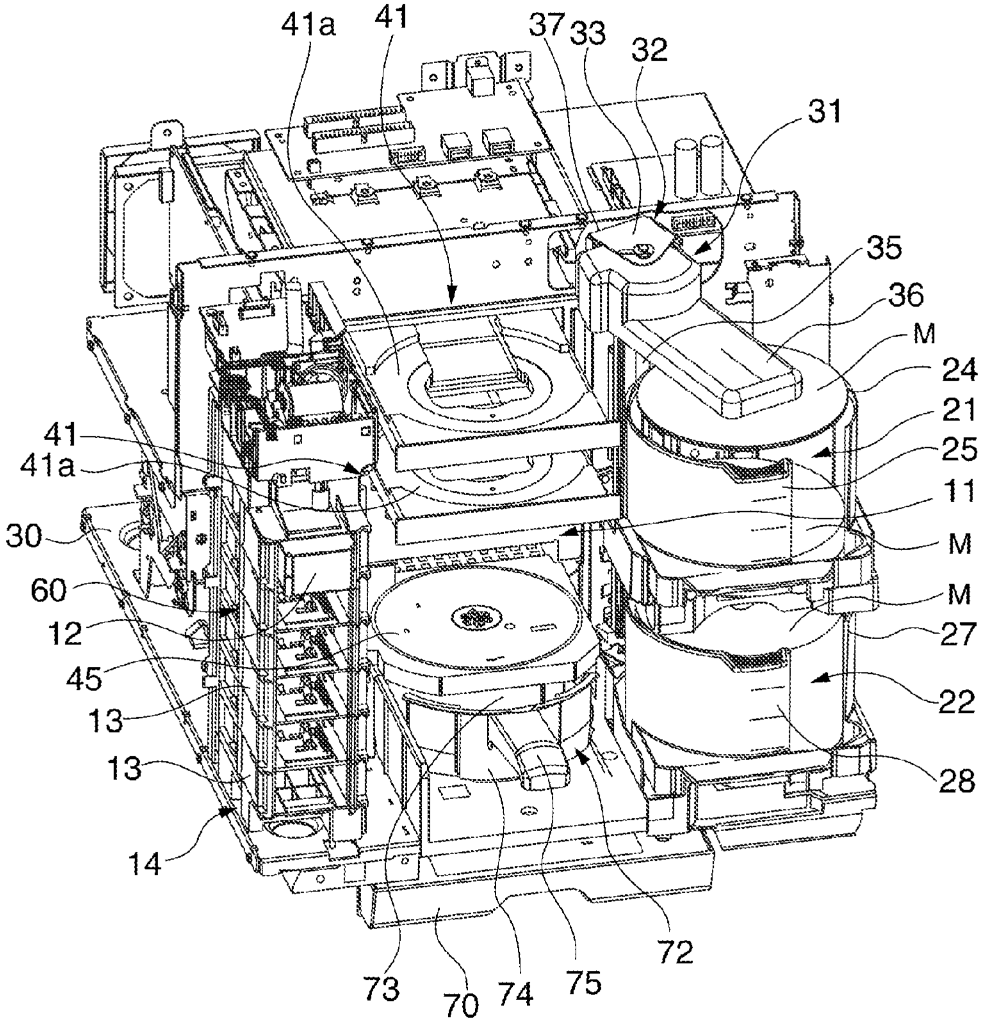
FIG. 2 is an oblique view from the top front side of the publisher with the case removed.

FIG. 1 is an external oblique view of a publisher according to this embodiment of the invention when the access doors thereof are open, and FIG. 2 is an oblique view from above the front of the publisher with the case thereof removed.

The publisher 1 is a device that writes data and prints on the label side of disc-shaped media such as CDs and DVDs, and has a basically rectangular box-shaped case 2. Doors 3 and 4 that open and close to the right and left are attached at the front of the case 2. An operating panel 5 having various indicators and operating buttons is disposed at the top left part of the case 2. Support legs 6 project down from the bottom of the case 2 on both right and left sides. A drawer mechanism 7 is disposed between the right and left legs 6.

As shown in FIG. 1, the access door 3 on the right side when seen from the front opens and closes for access to an open area 8 at the front of the publisher 1. The access door 3 opens and closes for loading unused media M through the open area 8 and for removing finished media M from the open area 8.

The access door 4 on the front left side opens and closes for replacing the ink cartridges 12 of the printer 11 shown in FIG.

2. When the door 4 is open, a cartridge carrier unit 14 with a plurality of cartridge holders 13 arrayed in a vertical stack is exposed.

As shown in FIG. 2, a media stacker 21 used as a media storage unit for holding a plurality of unused discs M (such as 50) to which data has not been written, and a media stacker 22 used as a media storage unit for holding a plurality (such as 50) of completed discs M or blank discs M, are disposed inside the case 2 of the publisher 1. The media stacker 21 and bottom media stacker 22 are disposed one above the other so that the center axes of the media M stored therein are the same. Media stacker 21 and media stacker 22 can be freely installed to and removed from their respective positions.

The top media stacker 21 has a pair of right and left curved side walls 24 and 25. The blank discs M are thus received from the top and can be stored in a substantially coaxial stack. The task of storing or loading blank discs M into the blank media stacker 21 can be done easily by opening the door 3 and pulling the media stacker 21 out.

The bottom media stacker 22 is identically constructed with a pair of right and left curved side walls 27 and 28. As a result, the stackers are configured so that discs M can be received from the top and can be stored in a substantially coaxial stack.

A media transportation mechanism 31 is located behind the media stackers 21 and 22. The media transportation mechanism 31 has a vertical guide shaft 35 disposed vertically between the main frame 30 and the top plate 33 of the chassis 32. A transportation arm 36 is supported so that it can move up and down and rotate on the vertical guide shaft 35. The transportation arm 36 can move vertically up and down along the vertical guide shaft 35 and can pivot right and left on the vertical guide shaft 35 by means of a drive motor 37.

Two media drives 41 are disposed one above the other at a position behind and beside the top and bottom stackers 21 and 22 and the media transportation mechanism 31. The carriage of the printer 11 is disposed movably below the media drives 41.

Each of the media drives 41 has a media tray 41*a*, which can move between a data writing position where data is recorded to the discs, and a media transfer position where the media can be loaded and unloaded from the media tray 41*a*.

The printer 11 also has a media tray 45 that can move between a printing position for printing on the label side of the media M, and a media transfer position where the media can be loaded and unloaded from the media tray 45.

FIG. 2 shows the media trays 41*a* of the top and bottom media drives 41 pulled out to the media transfer position, and the media tray 45 of the printer 11 therebelow pulled out to the media transfer position.

The printer 11 is an inkjet printer that uses color ink cartridges 12 (for six colors, specifically, black, cyan, magenta, yellow, light cyan, and light magenta, in this embodiment of the invention) as the ink supply mechanism 60. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the one media stacker 21 and between the pair of right and left side walls 27 and 28 of the other media stacker 22. A space is also formed between the top and bottom media stackers 21 and 22 so that the transportation arm 36 of the media transportation mechanism 31 can pivot horizontally for positioning directly above the bottom media stacker 22. When both media trays 41*a* are pushed into the media drives 41, the transportation arm 36 of the media transportation mechanism 31 descends and can access the media tray 45 at the media transfer position.

When both media trays 41*a* are in the data writing position and the media tray 45 is at the inside printing position, the transportation arm 36 of the media transportation mechanism 31 can descend below the height of the media tray 45. A guide hole through which a disc M released by the transportation arm 36 after descending to this position passes is located below the media transfer position of the printer media tray 45, and another media stacker can be installed in this guide hole 65.

As shown in FIG. 1 and FIG. 2, the drawer mechanism 7 has a drawer-like tray 70 disposed below the main frame 30 so that the drawer tray 70 can be pulled out from the main frame 30 and opened or slid into the main frame 30 and closed. The drawer tray 70 has a recess in which a stacker unit 71 can store the media M. When this drawer tray 70 is in the stored (closed) position, the stacker unit 71 is positioned below the guide hole 65. The center of the stacker unit 71 is positioned with the center of the stacker unit 71 coaxial to the center axis of both media trays 41*a* and the printer media tray 45 in the media transfer position. This stacker unit 71 accepts media M guided thereinto by the guide hole 65, and stores a relatively small number of media M (such as 5 to 10). The stacker unit 71 accepts the media M from the top and stores the media M stacked coaxially.

Another media stacker 72 (removable media stacker) that can hold more media M than the stacker unit 71 can be removably installed in the guide hole 65 and the stacker unit 71 of the drawer tray 70 in the storage position (see FIG. 2). This media stacker 72 also has two curved side walls 73 and 74, and the media stacker 72 can thereby receive media M from the top and can store a plurality of media M (such as 50) in a coaxial stack. A gap enabling the transportation arm 36 of the media transportation mechanism 31 to move up and down is also formed between the pair of curved side walls 73 and 74. A handle 75 that is held by the user when installing and removing the media stacker 72 is disposed at the top part of the one side wall 74.

When the media stacker 72 is installed, the media transportation mechanism 31 can take a blank disc M from the bottom media stacker 22, and then deposit the disc M in the media stacker 72 after recording data and printing are completed by the media drive 41 and the printer 11.

For example, the top media stacker 21 and the bottom media stacker 22 may each be loaded to the maximum capacity (50 discs+50 discs in this embodiment of the invention) with blank media M. All media M (50) in the bottom media stacker 22 are then sequentially processed and stored in the media stacker 72, and then all media M (50) in the top media stacker 21 are sequentially processed and stored in the emptied bottom media stacker 22. This enables processing the maximum number of media M (50+50) that can be loaded in the top media stacker 21 and the bottom media stacker 22 in a single operation (the "batch processing mode").

When the media stacker media stacker 72 has been removed, the media transportation mechanism 31 can remove a blank disc M from the top media stacker 21 or the bottom media stacker 22, and can store the completed disc in the stacker unit 71 of the drawer tray 70 in the stored (closed) position after recording data and printing by the media drive 41 and printer 11 are completed.

The completed media M can thus be removed from the stacker unit 71 by pulling the drawer tray 70 out. More specifically, completed media M can be sequentially removed one by one or plural discs at a time while processing other media M continues with the access door 3 remaining closed. This is also referred to herein as the "external discharge mode."

Internal Processes of the Host Computer and Publisher

Figure 3:
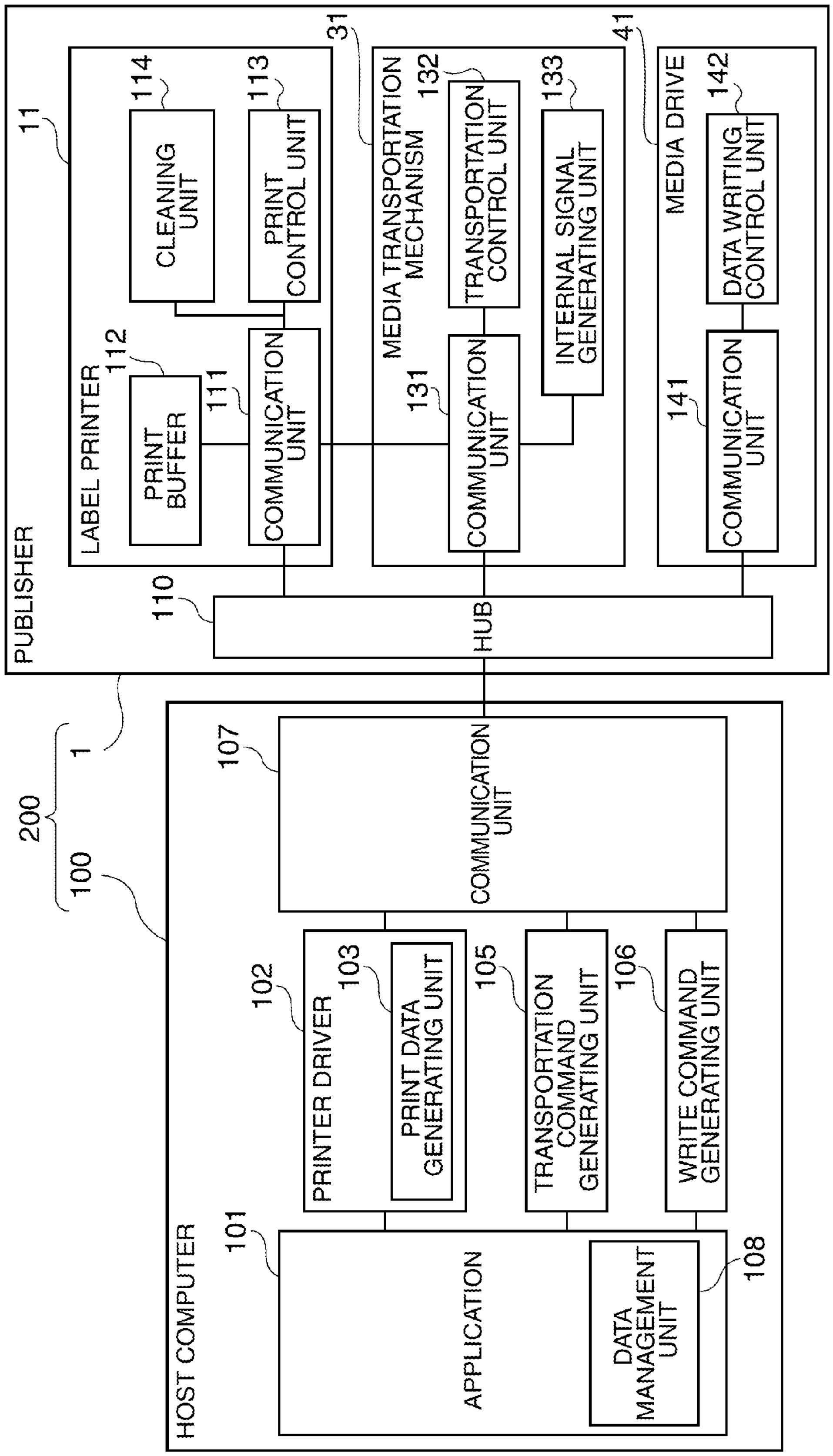
FIG. 3 is block diagram showing the configuration of an exemplary media publishing system.

The internal processes of the media processing system according to this embodiment of the invention including the publisher 1 described above and a host computer 100 that is communicably connected to the publisher 1 are described next. FIG. 3 is a block diagram showing the configuration of the media processing system, and FIG. 4 describes the media production process of the media processing system shown in FIG. 3.

The media processing system 200 shown in FIG. 3 includes a host computer 100 and a publisher 1. The host computer 100 has an application 101, printer driver 102, transportation command generating unit 105, write command generating unit 106, and communication unit 107.

The application 101 is an application program that runs on the host computer 100. The application 101 provides a user interface for sending the data required in the media production process of the publisher 1 to the publisher 1 through the printer driver 102, transportation command generating unit 105, and write command generating unit 106.

The printer driver 102 has a print data generating unit 103 that generates the print data and print commands in a format that can be processed by the printer 11 when a media production command is received from the application 101.

The communication unit 107 is an interface for sending commands, print data, and recording data to the publisher 1, and for receiving data that is sent from the publisher 1.

The transportation command generating unit 105 generates a transportation command in a format that can be processed by the media transportation mechanism 31 and sends the transportation command through the communication unit 107 to the publisher 1 when a media production command is received from the application 101.

The write command generating unit 106 generates a write command in a format that can be processed by the media drive 41 when a media production command is received from the application 101, and sends the write command with the recording data specified by the application 101 through the communication unit 107 to the publisher 1.

The user uses the application 101 to create and edit print data, for example, and to issue media production commands. The printer driver 102 is called by the application 101 and controls operation of the printer 11. Likewise, the transportation command generating unit 105 is called by the application 101 and directly controls operation of the media transportation mechanism 31. In addition, the write command generating unit 106 is called by the application 101 and controls operation of the media drive 41. The print data and data to be recorded on the media recording surface that are created by the user using the application 101 are stored by the data management unit 108 of the application 101.

The application 101 and printer driver 102 are programs that are previously stored in ROM (not shown in the figure) in the host computer 100, for example. Various function units are rendered by the CPU not shown of the host computer 100 reading and executing these programs.

The publisher 1 contains three USB devices including the printer 11, the media transportation mechanism 31, and the media drive 41. The USB devices inside the publisher 1 are communicably connected with the host computer 100 through a hub 110, which is an branch device for connecting a plurality of USB devices to a USB port of the host computer 100.

Each of the USB devices has a communication unit 111, 131, 141, respectively, as a communication interface.

In addition to the communication unit 111, the printer 11 has a print buffer 112 for storing converted print data, a print control unit 113 for controlling operation of the carriage and print head not shown, and a cleaning unit 114 that controls the print head cleaning operation.

The communication unit 111, print control unit 113, and cleaning unit 114 are rendered by a CPU not shown executing firmware stored in ROM or other nonvolatile storage unit.

The communication unit 111 is an interface for receiving print data and print commands, for example, sent from the host computer 100 through the hub 110. The print data temporarily stored in the communication unit 111 is converted in the print buffer 112 to printable dot data.

The print control unit 113 drives the print head and carriage, for example, based on the received print commands, and prints the dot data converted in the print buffer 112 on the label side of the media.

The cleaning unit 114 is rendered to execute various cleaning processes such as a wiping operation that wipes the print head, and vacuum operations that suck different predetermined amounts of ink from the nozzles of the print head and include a main vacuuming operation, a low volume vacuuming operation, a dummy vacuuming operation, and a resting operation. In this embodiment of the invention the cleaning unit 114 also determines if cleaning the print head is necessary in response to an internal signal sent from the media transportation mechanism 31. The cleaning unit 114 executes the foregoing cleaning process when it determines that cleaning is necessary with reference to the cleaning condition of the print head.

In addition to the communication unit 131, the media transportation mechanism 31 has a transportation control unit 132 that controls media transportation by means of the transportation arm 36, and an internal signal generating unit 133 that generates internal signals sent to the printer 11.

The communication unit 131 is an interface for receiving transportation commands sent from the host computer 100 through the hub 110. Based on transportation commands temporarily stored by the communication unit 131, the transportation control unit 132 drives the transportation arm 36 and the pickup mechanism for picking and holding the media, and thus transports the media. For example, the transportation arm 36 picks media from the media storage unit where the media are stacked according to commands from the transportation control unit 132. The transportation arm 36 then carries the picked media to the media tray 41*a* of the media drive 41 or the media tray 45 of the printer 11. The transportation arm 36 also picks up the printed media from the printer media tray 45, and conveys the picked media to the drawer tray 70, according to a command from the transportation control unit 132.

The internal signal generating unit 133 generates an internal signal sent to the printer 11 when a transportation command is received from the host computer 100.

The internal signals in this embodiment of the invention are signals sent from the media transportation mechanism 31 to the printer 11 when a transportation command for conveying media from a media storage unit (such as media stacker 21) to a media drive 41 is received from the host computer 100, and refer to signals that are sent and received within the publisher 1.

Note that there are six devices to which media can be delivered and from which media can be picked by the media transportation mechanism 31 in the publisher 1 according to this embodiment of the invention, that is, the media stackers

21 and 22, which are media storage units, the two media drives 41, the printer 11, and the stacker unit 71. The transportation command generating unit 105 can therefore generate at least thirty different transportation commands, and can send the appropriate type of transportation command to the publisher 1.

As described above, the internal signal generating unit 133 in this embodiment of the invention is configured to generate an internal signal when, of these thirty different transportation commands, a transportation command designating a media storage unit (such as media stacker 21) that stores unprocessed media as the pickup source and a media drive 41 that executes the data writing process as the destination is received. As a result, the cleaning process can be executed parallel to the data writing process if an appropriate internal signal is generated and sent to the printer when a transportation command for conveying media to a media drive 41 is received.

In addition to the communication unit 141, the media drive 41 has a data writing control unit 142 that controls the data writing operation.

The communication unit 141 is an interface for receiving write commands sent from the host computer 100 through the hub 110. The data writing control unit 142 then records the recording data on the recording surface of the media.

Note that the communication unit 131 and transportation control unit 132, and the communication unit 141 and data writing control unit 142, are rendered by the CPUs not shown of the media transportation mechanism 31 and media drive 41 executing firmware that is stored in ROM or other nonvolatile storage unit.

Media Production Process

Figure 4:
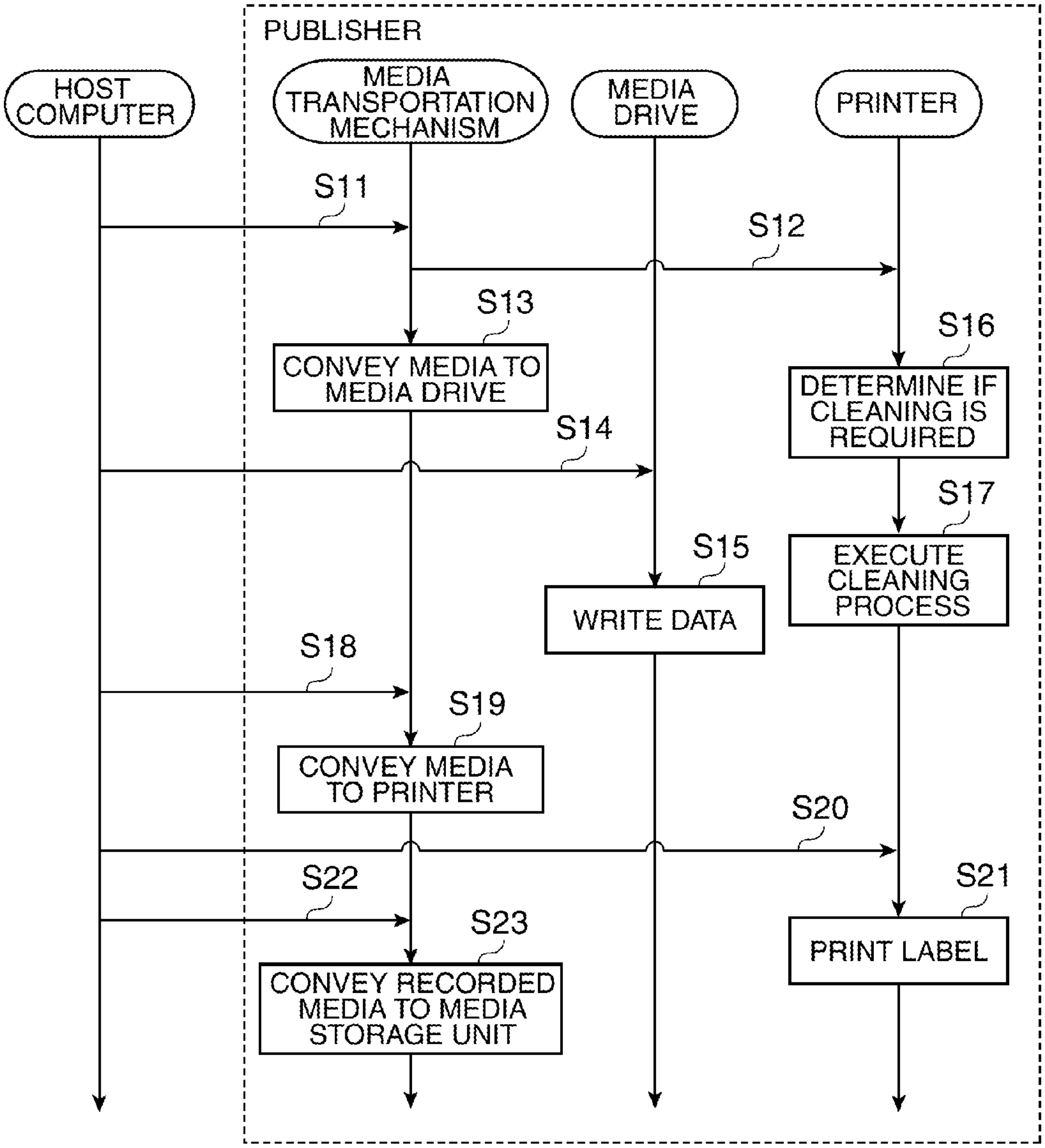
FIG. 4 is flow chart describing the media production process of the media processing system shown in FIG. 3.
Figure 5:
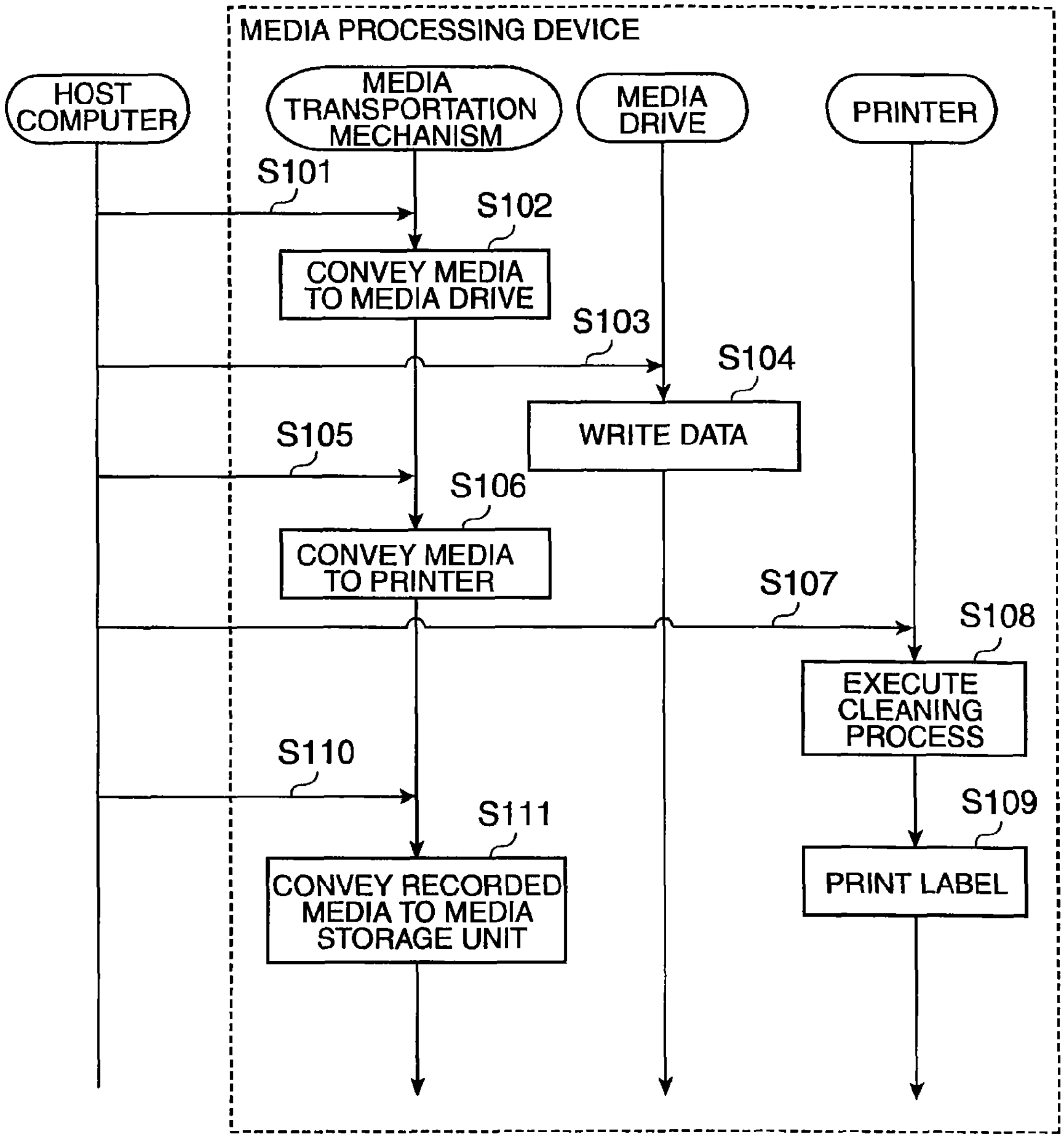
FIG. 5 (PRIOR ART)
FIG. 5 describes the control method of a media processing device according to the related art.

The media production process of the media processing system 200 described above is described next. FIG. 4 is a flow chart describing the media production process.

When producing the data to be printed on the label side of the media is completed on the input screen to the application 101 of the host computer 100, a media production command is sent from the application 101.

The transportation command generating unit 105 produces a transportation command for conveying unprocessed media to the media drive 41 according to the media production command from the application 101, and sends the transportation command to the media transportation mechanism 31 of the publisher 1 (step S11). When the media transportation mechanism 31 receives the transportation command, the internal signal generating unit 133 produces and sends an internal signal through the communication unit 131 to the printer 11 (step S12). The transportation control unit 132 also picks a disc from the stack in the media storage unit, and conveys the recording medium to the media drive 41 (step S13).

Based on the media production command from the application 101, the write command generating unit 106 produces a write command for writing recording data stored in the data management unit 108, and sends the write command to the media drive 41 of the publisher 1 (step S14).

The media drive 41 that received the media then executes the data writing process according to the data write command (step S15).

While steps S13 to S15 execute, the cleaning unit 114 of the printer 11 determines according to the internal signal received from the media transportation mechanism 31 in step S12 whether or not a cleaning process is necessary based on the cleaning condition of the print head (step S16). If it is determined in the decision step S16 that a cleaning process is required, the cleaning unit 114 executes the cleaning process (step S17). In this cleaning step S17 the cleaning operation is executed parallel to transportation of media to the media drive 41 (step S13) or writing data by the media drive 41 (step S15).

When the data writing process is completed by the media drive 41 (step S15), the transportation command generating unit 105 produces and outputs to the media transportation mechanism 31*a* transportation command for conveying the media from the media drive 41 to the printer 11 (step S18). When the media transportation mechanism 31 conveys the media from the media drive 41 to the printer 11 after receiving the transportation command (step S19), the print data generating unit 103 produces and sends a print command together with the print data to the printer 11 (step S20).

After receiving the print command, the printer 11 prints on the media based on the print data (step S21). The transportation command generating unit 105 then issues to the media transportation mechanism 31*a* transportation command for conveying the media from the printer 11 to a media storage unit (such as bottom media stacker 22) (step S22). Based on this command, the media transportation mechanism 31 conveys the media from the printer 11 to the media storage unit (step S23). This completes the media production process.

Note that the publisher 1 can also be applied to a configuration that does not have an internal media drive 41.

The printer 11 in this embodiment of the invention can thus clean the print head according to internal signals that are sent and received within the publisher 1 irrespective of whether or not print commands or cleaning commands are received from the host computer 100. Therefore, because execution of the cleaning process can be triggered by an internal signal before a print command is received from the host computer 100, cleaning can be prevented from causing a drop in the throughput of the media production process.

In addition, because the media transportation mechanism 31 sends an internal signal to the printer 11 when a transportation command for conveying media from a media storage unit to the media drive 41 is received from the host computer 100, the printer 11 can execute the cleaning process parallel to the media transportation process when triggered by an internal signal before a print command is received from the host computer 100.

In this embodiment of the invention the internal signals sent to the printer 11 are produced by the internal signal generating unit 133 of the media transportation mechanism 31, but the invention is not limited to this configuration. For example, a configuration in which the internal signals are sent from the media drive 41 to the printer 11 is also conceivable. In this configuration the internal signal generating unit 133 is disposed in the media drive 41, and generates and sends an internal signal to the printer 11 when a data write command is received from the host computer 100.

If the internal signal is sent to the printer 11 when the media drive 41 receives a write command from the host computer 100, the printer 11 can be triggered by the internal signal to execute the cleaning process parallel to the data writing process before the print command is received from the host computer 100.

Furthermore, when the print control unit 113 is rendered in the media drive 41, the processing time of the data writing process can be included in the internal signal.

More specifically, by including information identifying how much recording data there is in the write command sent from the host computer 100, the data writing control unit 142 receiving the write command can compute how much time is required by the data writing process time according to how much recording data there is to write. In this configuration the data writing control unit 142 calculates the data writing time based on the amount of recording data and the data recording speed of the media drive 41, which varies according to the type of media.

In general, when writing data to a CD (Compact Disc), the 1× write speed is 150 KB/sec, and the 2× write speed is 300 KB/sec. When writing data to a DVD (Digital Versatile Disc), the 1× write speed is 1385 KB/sec, and the 2× write speed is 2770 KB/sec. The time required for the data writing process can thus be calculated according to the data writing speed of the media drive 41, which varies according to the type of media being recorded. For example, if 100 MB of data is recorded to a CD at a 12× write speed, the writing process takes approximately 56 seconds.

If the printer 11 thus receives an internal signal containing the processing time of the data writing process, the cleaning unit 114 can change the type of cleaning process that is executed so that cleaning is finished within the received time of the data writing process. For example, if the data writing process time is 56 seconds as noted above, the cleaning unit 114 selects and executes a cleaning process that can be completed within 56 seconds.

Note, further, that if the data writing process time is shorter than the time required for the cleaning process, the cleaning process may be skipped and executed at a later time when the time required for the data writing process is sufficient to complete the cleaning process parallel to the data writing process.

Yet further, the hub 110 or branch device of the publisher 1 can also be configured to relay either or both of the transportation commands and write commands sent from the host computer 100 to the printer 11. More specifically, the printer 11 can receive the transportation commands and write commands sent from the hub 110 as internal signals. If the printer 11 can receive transportation commands and write commands directly from the branch device, there is no need to render the function of the internal signal generating unit 133 in the media transportation mechanism 31 or the media drive 41.

By relaying transportation commands and write commands sent from the host computer 100 to the printer 11, this configuration enables the cleaning unit 114 of the printer 11 to execute the cleaning process when triggered by a transportation command or write command.

Although the present invention has been described in connection with the preferred embodiments thereof with reference to the accompanying drawings, it is noted that various changes and modifications will be apparent to those skilled in the art in light of such disclosure. Any and all such changes and modifications are intended to be included within the scope of the present invention to the extent embodied in any of the claims appended hereto.

What is claimed is:

1. A media processing device, comprising:
- a media storage unit that holds media;
- a printing unit configured to execute a printing process that discharges ink from nozzles of a print head and prints print data on a label side of the media, and to apply a cleaning process that cleans the print head;
- a data writing unit configured to execute a data writing process that writes writing data on a recording surface of the media; and
- a transportation unit configured to convey the media;
- wherein the printing unit executes the cleaning process while the data writing unit executes the data writing process, and
- wherein the transportation unit conveys the media from the data writing unit to the printing unit after the data writing process is completed by the data writing unit.

2. The media processing device described in claim 1, further comprising:
- a communication unit that receives a command from a host device; and
- an internal signal generating unit that generates an internal signal that is sent to the printing unit when the command is received from the host device;
- wherein the printing unit executes the cleaning process according to the internal signal.

3. The media processing device described in claim 2, wherein the command received from the host device is a transportation command for conveying the media from the media storage unit to the data writing unit.

4. The media processing device described in claim 2, wherein the command received from the host device is a data writing command for executing the data writing process by the data writing unit.

5. The media processing device described in claim 4, wherein the communication unit receives an amount of writing data from the host device, the media processing device further comprising:
- a data writing control unit that calculates a data writing time of the data writing unit based on the amount of the writing data received and a data writing speed of the data writing unit.

6. The media processing device described in claim 5, wherein the printing unit receives the data writing time and executes the cleaning process according to the data writing time of the data writing unit.

7. The media processing device described in claim 5, wherein the printing unit receives the data writing time and determines a type of the cleaning process according to the data writing time of the data writing unit.

8. A control method for a media processing device having a printing unit, a transportation unit, a media storage unit, and a data writing unit, the method comprising:
- receiving a command from a host device;
- conveying media from the media storage unit to the data writing unit;
- executing a data writing process by the data writing unit that writes writing data on a recording surface;
- executing a cleaning process that cleans a print head of the printing unit while the data writing unit executes the data writing process;
- conveying the media from the data writing unit to the printing unit after the data writing process is completed by the data writing unit; and
- executing a printing process that discharges ink from nozzles of the print head and prints print data on a label surface of the media.

9. The control method for the media processing device described in claim 8, further comprising:
- generating an internal signal when the command is received from the host device;
- sending the internal signal to the printing unit; and
- executing the cleaning process according to the internal signal.

10. The control method for the media processing device described in claim 9, further comprising:
- receiving an amount of writing data from a host device;
- calculating a data writing time of the data writing unit based on the amount of the writing data received and a data writing speed of the data writing unit; and
- sending the internal signal including the data writing time to the printing unit.

11. The control method for the media processing device described in claim 10, further comprising:

executing the cleaning process according to the data writing time of the data writing unit.

12. The control method for the media processing device described in claim 10, further comprising:

determining a type of the cleaning process according to the data writing time of the data writing unit.

* * * * *